Feb. 9, 1954
H. F. HOBBS
2,668,552
VARIABLE-RATIO POWER TRANSMISSION APPARATUS
Filed May 25, 1950
4 Sheets-Sheet 1
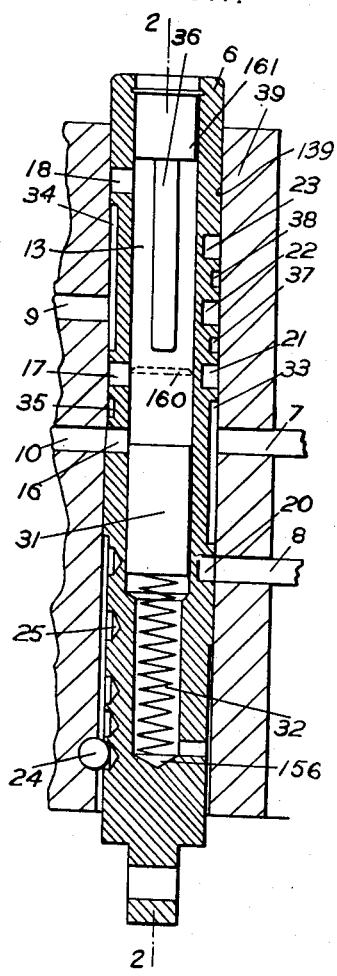
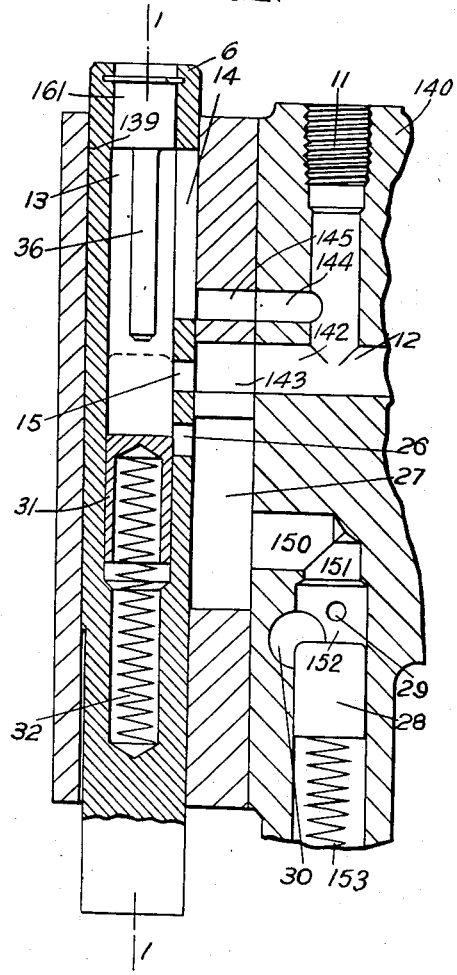
Inventor
Howard F. Hobbs
By
Young, Emery, Thompson
Attorneys

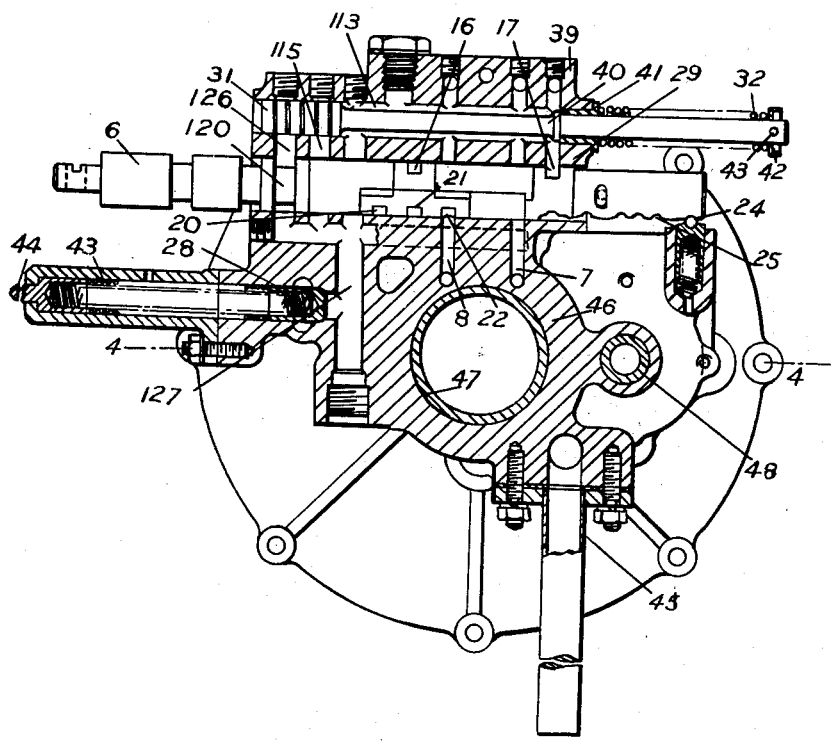

Feb. 9, 1954             H. F. HOBBS             2,668,552
VARIABLE-RATIO POWER TRANSMISSION APPARATUS
Filed May 25, 1950                             4 Sheets-Sheet 3

Inventor
Howard F. Hobbs
By
Young, Emery + Thompson
Attorneys

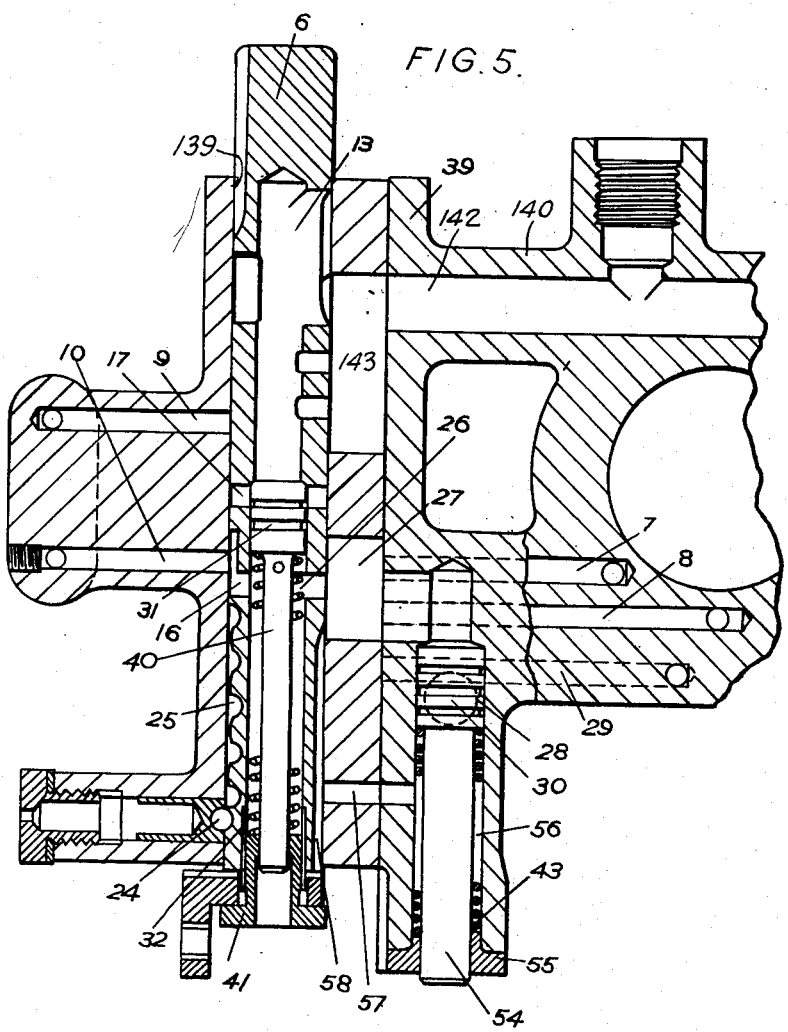

Patented Feb. 9, 1954

2,668,552

UNITED STATES PATENT OFFICE 2,668,552

VARIABLE-RATIO POWER TRANSMISSION APPARATUS

Howard F. Hobbs, Leamington Spa, England, assignor to Hobbs Transmission Limited, Leamington Spa, England, a British company Application May 25, 1950, Serial No. 164,112

9 Claims. (Cl. 137—115)

This invention relates to a fluid pressure regulating selector valve suitable for variable ratio power transmission apparatus of the kind having a number of hydraulically actuated friction devices associated with gearing whereby engagement of one or another or engagement of a different combination of the said devices provides two or more torque speed ratios, the hydraulic pressure for engaging the friction devices being supplied to spaces leading to movable elements (e. g. flexible diaphragms) through which the pressure is transmitted to the friction devices.

In apparatus of this kind the friction devices may comprise input clutches and reaction brakes. The different combinations of engagement of clutches and brakes may be selected by a slideable piston valve operating in a bore, and movable to a series of positions to select a different series of ports, thereby conditioning the apparatus for operation in different ratios.

The torque carried by one friction device can be different from that carried by another, and that to be carried in one ratio can also be different from that to be carried in another ratio, for example: the clutches may need to have the same torque capacity for each ratio since they may carry the input torque, but reaction brakes may need to carry higher torque for operation in higher ratios than in lower ratios, since the reaction torque varies.

The object of the present invention is to provide a simple pressure regulating selector device whereby suitable pressures can be provided which can be utilised for pressing the friction devices of a transmission apparatus into engagement.

A further object of the invention is to provide a valve having a selector valve member movable to different positions in order to direct fluid pressure to different outlet ports which pressure is varied automatically according to the setting of said selector valve member.

In order that the invention may be clearly understood, a constructional form thereof will now be described by way of example with reference to the accompanying drawings wherein—

Figure 1 is a diagrammatic sectional view of valves made in accordance with the invention for controlling an apparatus of the kind hereinbefore defined, having three forward speeds, neutral, and reverse and being a section on line 1—1 on Figure 2;

Figure 2 is a sectional view on the line 2—2 on Figure 1;

Figure 3 is a sectional view through the valves of another form of device made in accordance with the invention for an apparatus having four forward speeds, neutral, and reverse;

Figure 5 is a sectional view through the valves of a modified device made in accordance with the invention, suitable for an apparatus having five forward speeds, neutral and reverse.

Figure 4:
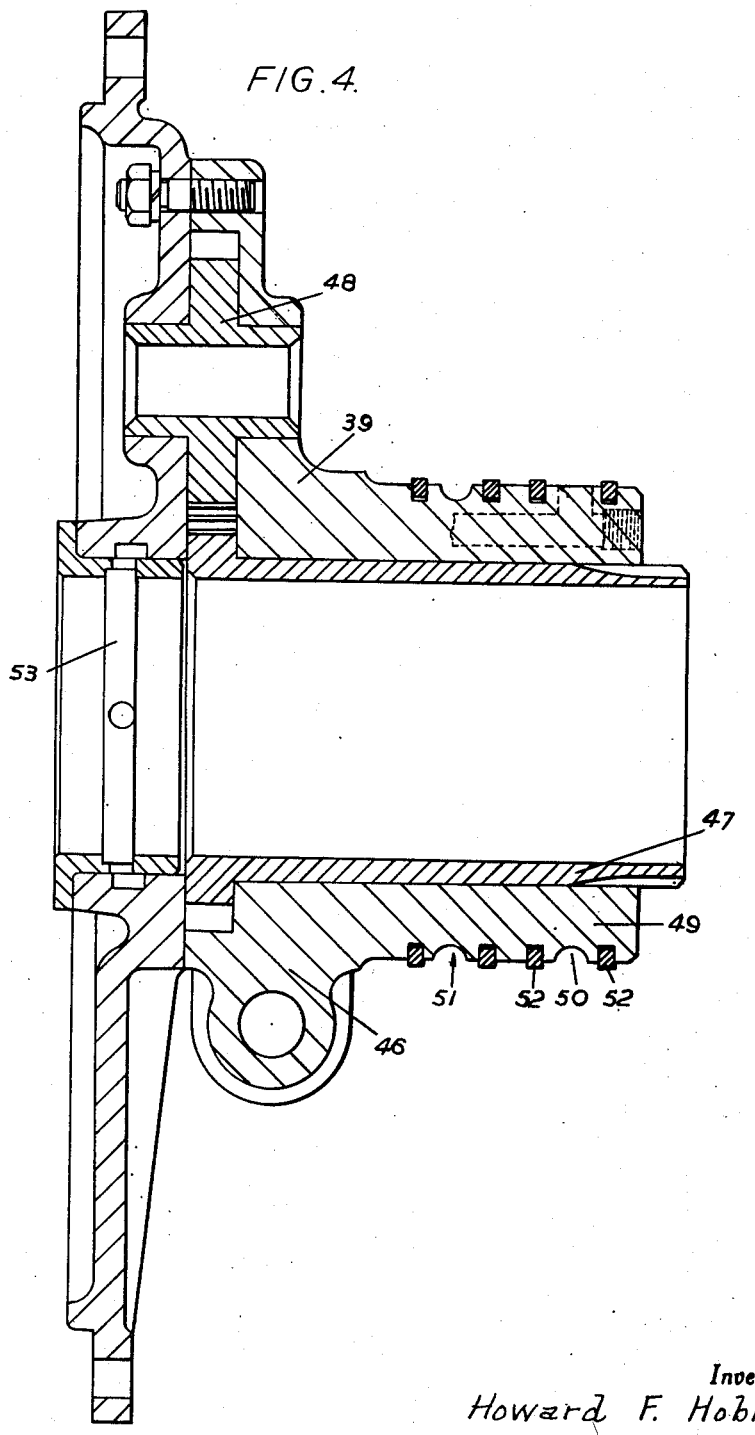
Figure 4 is a sectional view through the pump and feed journal forming part of the apparatus, the section being taken on the line 4—4 on Figure 3.

In the arrangement shown in Figures 1 and 2, the part 39 is a valve housing which is attached to the housing 140 of an apparatus of the kind hereinbefore specified. The valve housing 39 is formed with a selector valve chamber 139 in which a selector valve part or member 6 is movably located. The housing 39 has ducts 7, 8 which are connected to the actuating spaces of two input friction clutches, and ducts 9, 10, which are connected to the actuating spaces of two reaction friction brakes. The housing 140 has a channel 11 which will be connected to a pump driven by a suitable part at the rear of the apparatus and a channel 12 which is connected to another pump driven by a suitable part at the front of the said apparatus. These two channels join a passage 142 which leads to a fluid pressure duct 143 in the housing 39 which in turn leads to the valve chamber 139. The housing 140 also has a channel 144 leading from the channel 11 to a second fluid pressure duct 145 in the housing 39 that leads to the chamber 139. According to different settings of the valve member 6, ducts in the latter connect the fluid pressure ducts 143, 145, with the appropriate selections of the ducts 7, 8, 9, 10, thereby producing the required ratios. These settings of the valve member 6 may be located by a ball detent 24 which enters each of five depressions 25 in the valve member 6.

The valve member 6 has the following features:

1. A central bore 13 which constitutes a relief valve chamber and slidably contains a relief valve member 31.

2. Liquid inlet ports 14, 15, through which the liquid under pressure from the ducts 143, 145, can enter the central bore or chamber 13.

3. Openings 16, 17, 18, through which liquid from the bore 13 reaches the brake supplying ducts 9, 10.

4. Grooves 20, 21, 22, 23 (which communicate with the space 27 at a position not shown in the drawing), through which liquid from the space 27 can reach the clutch supply channels 7, 8.

5. Exhaust outlet 26. The ducts 14, 15, and 26 can serve as exhaust ducts at different settings of the valve member 6 and for this purpose they communicate with a space 27 in the housing 39. The space 27 leads through ducts 150, 151, to an exhaust bore 152, containing a relief valve 28 pressed by spring 153. The bore 152 opens into a lubricant supply channel 29 and an exhaust opening 30. The oil pressure moves the piston against the spring and movement first uncovers the lubricant supply channel 29 and then the exhaust opening 30. The pressure of liquid supplied to the clutches is controlled by the relief valve 28, this pressure remaining constant irrespective of the position of the control valve member 6.

6. Exhaust grooves 33, 34, 35, 37, 38, which align (at required positions of the member 6) with drillings (not shown) in the housing 39, which open to the casing of the apparatus.

7. A closed end forming an abutment wall 156 between which and the relief valve member or piston 31, a spring 32 is disposed.

8. The bore 13 is closed by a plug 161 which carries a pin 36 inside the bore 13 against which the piston 31 can abut in certain circumstances.

When the control valve member 6 is in the setting shown, the piston 31 must move to the position shown to allow oil to pass to the openings 16, 26, and thence to the duct 10, and space 27. In the position shown, the reverse ratio is selected and the highest pressure is required on the brakes since reaction torque from the gear unit will be greatest when operating in reverse. The spring 32 is in maximum compression for this condition of operation thus producing maximum liquid pressure for engaging the brakes. If the member 6 is moved downwards to the next position, none of the ducts 7, 8, 9, 10 is open to pressure, and in this position the ducts 7, 8, align with the exhaust groove 33, the duct 9 remains in communication with the exhaust groove 34, and the duct 10 aligns with exhaust groove 35. Movement of the valve downwards to the next position will bring 17 into alignment with the duct 10 and opening 15 will lead to space 27. Oil can now be led to 10 and 27 but the position of the piston 31 relatively to the member 6 is now as shown by the dotted line 160. The spring 32 will undergo less compression and pressure maintained within the bore 13 and in the duct 10 leading to the brake will be correspondingly reduced, as is required for operation in first ratio. If the valve is moved downwards to still the next position, the piston 31 will abut the pin 36 providing still less compression on the spring 32, and still lower pressure in the system for when in this position the opening 18 aligns with the duct 9 and opening 14 with the space 27. The groove aligns with the duct 7. This gives the second ratio for which the minimum pressure is required. The third ratio is provided by further movement of the valve when groove 23 aligns duct 7 and groove 21 duct 8. Ducts 9, 10 are opened to exhaust through exhaust groove 34. The same pressure is maintained in the bore 13 as with second gear.

In the apparatus illustrated in Figure 3 the control valve member 6 can be moved into six different positions so as to provide reverse, neutral, first, second, third, and fourth. The openings and the grooves in valve 6 and valve body 39 in this case are arranged so that the valve can be operated from a lever working in a gate. In this case the first ratio position for example will not be adjacent to the second ratio and the valve may be moved through two or more stages to select from one ratio to the next. It will be observed that the valve member or piston 31 is located in a bore in the body 39 adjacent but not in the valve 6. The valve 31 is also provided with a stem 40 of reduced diameter, which is a working fit in bush 41 and the arrangement serves to reduce the effective area of the valve and enables the spring 32 to be more easily designed to give the required rate. Spring 32 is located between the bush 41 and collar 42 which is attached to the valve by means of pin 43. Liquid from the pump is led to the bore 113 and this causes the valve 31 to move down to the opening 126 and provide suitable pressure to be directed by the valve 6 to the brakes by means of grooves 16, 17. If this valve 6 is moved so that the groove 120 aligns with opening 115, then the valve 31 will move downwards only enough to open 115. In this position spring 32 will be under less compression and a reduced pressure will thereby be maintained in bore 113. The space 127 leads to the clutches and pressure in this space is controlled by the valve 28. In one form of construction, this valve has a spring 43 abutting a movable cap 44. This is arranged to interconnect the engine throttle so that when the throttle is shut, pressure in the space 127 is a minimum. If the throttle is opened and the cap 44 moved inwards, pressure is increased. The pressure acting in the clutches is regulated according to throttle openings and in accordance with the torque provided by the engine. The purpose of this is to provide the greatest degree of smoothness during change of ratio. The suction pipe 45 leads from the sump to pump 46.

Pump 46 (Figures 3 and 4) comprises the driving gear 47 and the idler gear 48. The journal 49 is provided with oil feed grooves 50, 51, and oil seal rings 52, which serve to feed the liquid under pressure to the rotary clutch housing. Excess liquid for lubricating purposes is fed to groove 53 and thence to the various parts of the apparatus through suitable oil ducts.

In the modification shown in Figure 5 the selector valve member 6 has a bore in which the relief valve 31, operates. The relief valve is provided with a stem 40 of reduced diameter. The clutch relief valve 26 also has a stem 54, which is a working fit in bush 55, thereby forming a liquid space 56. This is connected by the duct 57 which in the position shown mates with the groove 58 in the control valve 6 which serves to open the space 56 to exhaust. If the valve 6 is moved downwards until the opening 26 aligns with the duct 57, the pressure in the bore 13 will move the valve 31 downwards and will reach the space 56 thereby assisting the spring 43 and causing a greater pressure to operate in the space 27 and therefore, in the clutches of the apparatus.

In operation valve member 6 is selected to open liquid pressure delivered to the space 13 from an input and/or input pump to the required clutches and brakes. The pressure acts on the valve 31 causing it to take up a position owing to the arrangement of openings already described so that the spring 32 will be compressed the required amount to maintain the necessary oil pressure. Movement of the valve member 6 to another position may bring different openings into operation thereby causing the valve 31 to move to a different position providing greater or lesser pressure in the system owing to greater or lesser pressure on the spring 32, and as may be required for operation of the clutches and brakes. The provision of an extension of reduced diameter such as 40 operating in bush 41 may either provide a reduced area as in the arrangement shown in Figure 3 or may be arranged at the opposite end of the valve—as in Figure 5—so that the liquid pressure can act at both ends of the valve 41, either over the whole range of operation or when the valve member 6 is selected in one or another position. If the input clutches of a variable power transmission are required to carry the same torque in each ratio, the clutch relief valve may be arranged as in Figure 1, in which case the liquid pressure will remain constant, or as in Figure 2, in which case the pressure will be constant for constant throttle openings. If a greater pressure is required in one or more ratios, the valve 28 may be arranged as in Figure 5 so that some pressure can act at both ends of the valve when valve member 6 is in one or more positions. In variable power transmission of the kind described, the brakes will invariably requires different pressure in some ratios, since the reaction torque to be carried by the brakes will vary according to the ratio. Apparatus according to the invention has the advantage that the valve 31 automatically adapts a suitable position to give the required compression of the spring 32, when the valve member 6 is moved to different positions. This involves no manual effort on the part of the operator except that required to move the valve member 6, liquid pressure and force from the spring 32 being selfcontained in the valve.

I claim:

1. A pressure regulating selector device suitable for power transmission apparatus of the character described having a valve housing member provided with a bore, said housing member having at least one fluid entry duct opening to said bore and at least two fluid delivery ports leading from said bore and located at different distances along the bore, a reciprocable selector valve member located in said bore, at least two fluid relief openings in at least one of said members, said selector valve member having openings for effecting communication between the entry duct and said delivery ports at different moments corresponding to different positions of said selector valve member in the bore and between said entry duct and said relief openings, a relief valve chamber, a relief valve piston member in said chamber and movable across both said relief openings, spring means urging said relief valve piston member towards its position of closing said relief openings, said relief valve piston member and said chamber being relatively movable to vary the length of said chamber according to which of said relief openings is opened by said relief valve piston member, and thus to vary the pressure of said spring means according to the different positions of said selector valve member thereby varying the pressure of the fluid at the delivery ports according to the different positions of said selector valve member.

2. A device as claimed in claim 1 wherein the relief valve chamber is formed within the selector valve member, the selector valve member having an abutment wall between which and the relief valve member the said spring is located, and said selector valve member has at least two openings adapted to serve as exhaust outlets opened by the relief valve member at different settings of the selector valve member, said openings being positioned such that the selector valve member and the relief valve member are in relatively different positions at said different settings whereby the spring is compressed to a greater extent for one setting of the selector valve part than for another setting thereof.

3. A device as claimed in claim 1 wherein the relief valve member fits the relief valve chamber at one part but is of reduced diameter at another part to which the liquid pressure is supplied, and at least two ducts are provided leading from the selector valve chamber to the relief valve chamber and which are connected to exhaust by the selector valve part in different settings of the selector valve part whereby the relief valve member moves to different positions in different portions of the selector valve part with corresponding change of compression of the spring.

4. A device as claimed in claim 1 having a duct controllable by the selector valve member and positioned for supplying liquid pressure to the relief valve chamber at a position to urge the relief valve member towards its exhaust closing position, to assist the action of the said spring in at least one setting of the selector valve part.

5. A device as claimed in claim 1 having a second relief valve and wherein pressure opens said relief valve chamber of said supply openings and to a space which leads to at least one other of said supply openings, said space also leading to said second relief valve which controls the pressure therein.

6. A device as claimed in claim 1 having a second relief valve and wherein pressure opens said relief valve chamber of said supply openings and to a space which leads to at least one other of said supply openings, said space also leading to said second relief valve which controls the pressure therein and wherein said selector valve member has grooves which in certain positions mate with said space and with a duct supply opening.

7. A device as claimed in claim 1 having a second relief valve and wherein pressure opens said relief valve chamber of said supply openings and to a space which leads to at least one other of said supply openings, said space also leading to said second relief valve which controls the pressure therein and wherein said selector valve member has grooves which in certain positions mate with said space and with a duct supply opening and in which the second relief valve has an extension of reduced diameter surrounded by bush forming a space for oil pressure, which space is open to pressure regulated by said first relief valve when the selector valve is in at least one of its positions.

8. A device as claimed in claim 1 in which said selector valve chamber is formed in the body of a pump which supplies the liquid pressure.

9. A device as claimed in claim 1 in which said selector valve chamber is formed in the body of a pump which supplies the liquid pressure and in which the said body is extended and carries grooves and oil seal rings to form part of a liquid feed to the rotary part of said friction devices.

HOWARD F. HOBBS.

References Cited in the file of this patent

UNITED STATES PATENTS

| Number | Name | Date |
| --- | --- | --- |
| 2,170,538 | Sarver | Aug. 22, 1939 |
| 2,359,802 | Stephens | Oct. 10, 1944 |
| 2,362,945 | Stephens | Nov. 14, 1944 |
| 2,440,590 | Kegpesse | Apr. 27, 1948 |